(12) United States Patent
Mosher, II et al.

(10) Patent No.: US 6,267,047 B1
(45) Date of Patent: Jul. 31, 2001

(54) PORTABLE GRIDDLE STOVE WITH DUAL COOKING SURFACES

(75) Inventors: Robert F. Mosher, II; Norman D. Neugebauer, both of Wichita; Randall L. May; Robert L. Lawhon, both of Andover, all of KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/371,262

(22) Filed: Aug. 10, 1999

(51) Int. Cl.[7] .............................. A47J 37/06; A47J 37/07
(52) U.S. Cl. .................... 99/339; 99/400; 99/401; 99/422; 99/425; 99/446; 99/447; 99/445
(58) Field of Search ............................ 99/385, 407, 449, 99/400, 422, 339, 340, 450, 447, 446, 425, 445; 126/41 R, 25 R (56) References Cited

U.S. PATENT DOCUMENTS

| | | | |
|---|---|---|---|
| 3,369,481 | * | 2/1968 | Pappas ............................ 99/450 X |
| 3,678,844 | * | 7/1972 | Marshall .......................... 99/425 X |
| 4,724,823 | * | 2/1988 | Simpson ........................... 99/447 X |
| 5,009,151 | * | 4/1991 | Hungerford ...................... 99/425 X |
| 5,490,452 | * | 2/1996 | Schlosser et al. .................... 99/422 |
| 5,782,230 | * | 7/1998 | Linnebur et al. ................ 99/447 X |
| 5,974,954 | * | 11/1999 | Rigney et al. .................... 99/450 X |

OTHER PUBLICATIONS

"Lodge Cast Iron: Lodge 21 Inch Grid/Iron Griddle featuring 2 Different Grilling surfaces indoor/outdoor cooking." Cookware Manufacturers Association, Copy of picture of Griddle. (date unknown).

* cited by examiner

*Primary Examiner*—Reginald L. Alexander
(74) *Attorney, Agent, or Firm*—Kramer Levin Naftalis & Frankel LLP.

(57) ABSTRACT

A portable griddle stove has two non-stick cooking surfaces, either of which can withstand being on the underside of the cooking surface in use and the heat applied to the underside surface. A heat shield and heat diffuser control the temperature applied to the underside of the cooking surface by providing radiant heat to the center portion of the cooking surface and cooling the combustion gas diffused to the perimeter of the cooking surface. Secondary air provided through openings in case the and heat shield assist in cooling the combustion gas.

13 Claims, 8 Drawing Sheets

FIG. 8

PORTABLE GRIDDLE STOVE WITH DUAL COOKING SURFACES

FIELD OF THE INVENTION

The present invention relates to a portable griddle stove, more particularly to a portable griddle stove with dual cooking surfaces.

BACKGROUND INFORMATION

Cooking devices used for camping and other outdoor activities are well known in the art. For example, The Coleman Company, Inc. of Wichita, Kans. has been manufacturing portable cooking stoves for many years. Such portable cooking stoves include, for example, one or two burners supplied with propane by an attachable tank. Such a portable stove provides direct flame impingement on the cooking surface placed on the burner, generally a pot or skillet. Direct flame impingement does not present a problem in this circumstance as the pot or skillet is designed to withstand the heat from the flames. Even pots or skillets that include a non-stick coating on the cooking surface, such as TEFLON® manufactured by DuPont of Delaware, can be used with the portable stove as the underside of the pot or skillet is untreated metal that can withstand the direct flame impingement, whereas a non-stick surface could not withstand the high temperature from direct flame impingement. In addition, portable stoves generally do not provide a cooking surface and if a cooking surface is provided, the cooking surface is often treated with a non-stick coating and thus cannot be reversible as the underside would then have a non-stick coating that would be damaged from the heat.

Another type of portable cooking device is a barbecue grill, whether fueled by charcoal, natural gas or propane. While a barbecue is often portable, it is not suitable for use indoors due to safety reasons and size limitations. Further, the cooking surface for a barbecue grill is generally a metal grill that provides sufficient support for the food to be cooked while allowing the heat from the charcoal or burners to pass directly through the grill to cook the food. Barbecue grills generally do not provide a solid cooking surface such as griddle surface.

There do exist reversible cooking surfaces, such as a cast iron griddle manufactured by the Lodge Manufacturing Company that provides a cast iron plate that can be placed over a heat source such as flames from a campfire, either side of the cast iron plate providing a cooking surface such as a flat surface on one side and a grooved surface on another side. Such a plate, however, cannot have a non-stick coating on both sides of the griddle that would be exposed to high temperatures.

A popular cooking surface that is not suitable for portable or outdoor use is an electric griddle. An electric griddle usually includes a non-stick cooking surface that is heated on its underside by an electrically heated coil. Such an electric griddle requires a source of alternating current electrical power that is often not available for convenient portable or outdoor use, such as when camping or hiking.

Thus, it is desirable to have a portable cooking system that provides two non-stick cooking surfaces.

SUMMARY OF THE INVENTION

A portable cooking system includes a tube burner and a diffuser disposed above the tube burner providing radiant heat to the center portion of the cooking surface and directing combustion gas towards the perimeter of the cooking surface. A secondary air flow system provides secondary air to mix with the diffused combustion gas to control the temperature of the combustion gas impinging on the perimeter of the cooking surface. As a result of the diffuser and the secondary air flow system, the temperature of the heat applied to the underside of the cooking surface in use can be controlled to allow the underside surface to have a non-stick coating.

DETAILED DESCRIPTION OF THE INVENTION

Figure 1:
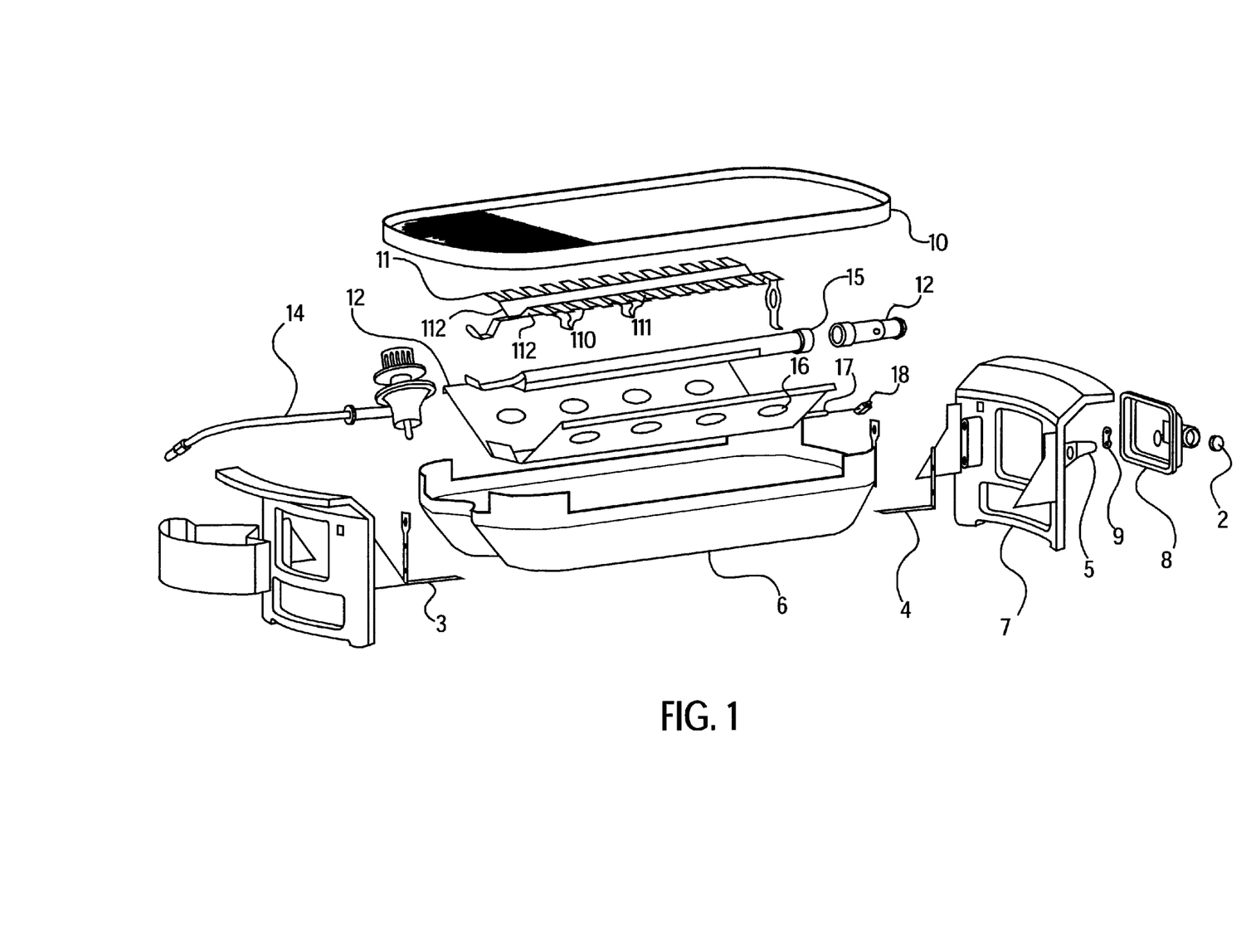
FIG. 1 illustrates an exploded view of an exemplary griddle stove according to an embodiment of the present invention.

As illustrated in FIG. 1, a griddle stove according to an exemplary embodiment of the present invention includes, for example, a chassis, a fuel delivery system, an electronic ignition system, a heat distribution system and cooking surfaces. The chassis includes, for example, a case 6, leg brackets 3, 4 and handles 7. Handles 7 have, for example, universal design so that a particular handle 7 can be used on either end of the griddle. The particular appearance and structure of handles are a matter of design choice provided that adequate support is provided for the case 6 and other components of the grill. The leg brackets 3, 4 and handles 7 are formed of, for example, glass filled nylon, such as polyester thermoplastic, flame retardant, 30% glass which has high heat properties and moderate cost, although other suitable material could be used. The leg brackets 3, 4 provide exemplary means to connect the handles 7 to case 6 and also provide stiffness to the case 6 as well as thermal isolation between the case 6 and the handles 7. Case 6 is formed of, for example, cold rolled steel, draw quality, and can be painted with heat-resistant paint if desired. The chassis also provides structural support for the other components of the griddle as described below.

Figure 2A:
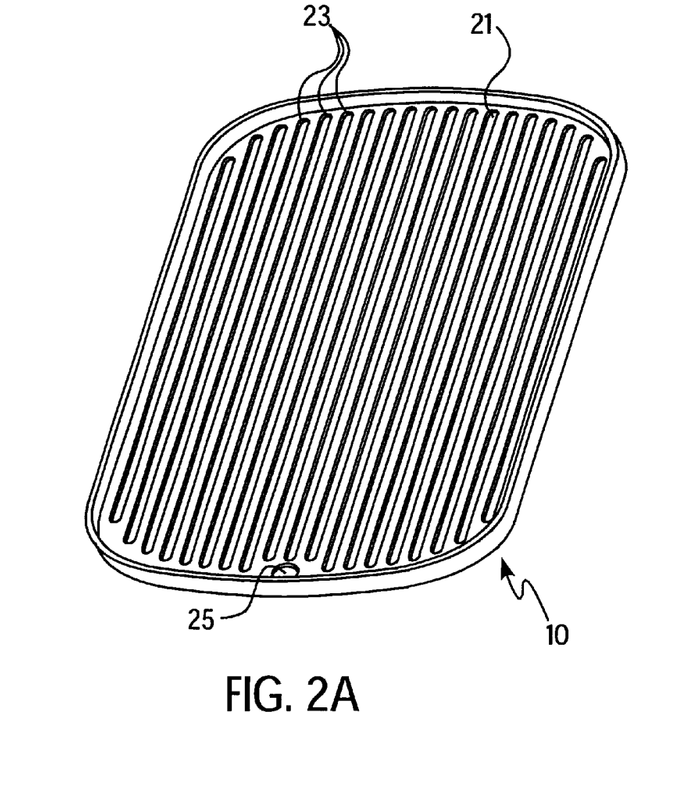
FIGS. 2A and 2B illustrate exemplary cooking surfaces according to an embodiment of the present invention.
Figure 2B:
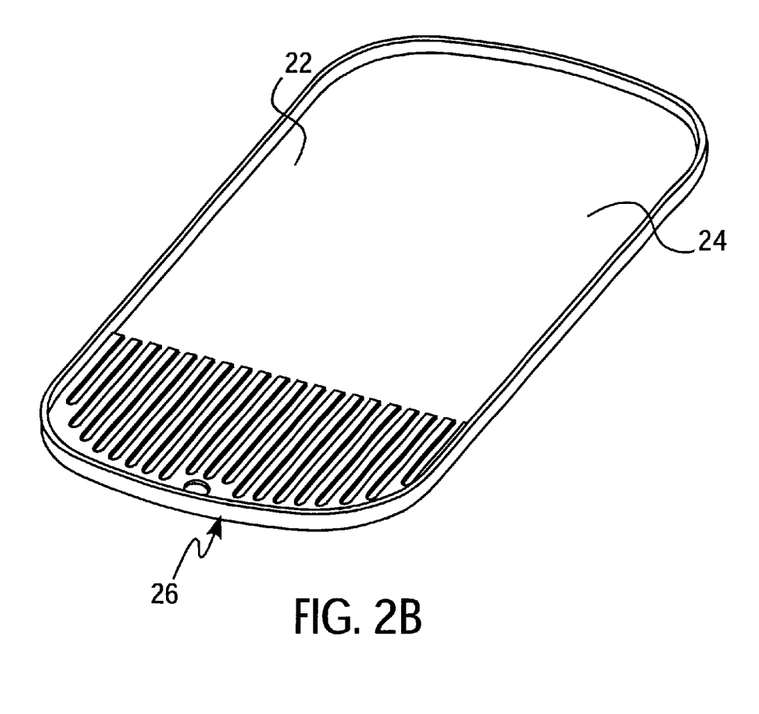

FIGS. 2A and 2B illustrate two exemplary cooking surfaces 21, 22 disposed on opposite sides of griddle 10. Griddle 10 is formed of, for example, cast aluminum having a non-stick surface coating, such as TEFLON, on cooking surfaces 21 and 22. Griddle 10 can attach to case 6 by, for example, a slip fit or other suitable connection means.

Cooking surface 21 includes a series of raised ribs extending substantially the length of cooking surface 21 while cooking surface 22 includes a flat cooking area 24 and a series of shorter raised ribs disposed at an end area of the cooking surface. The configuration of the cooking surfaces 21, 22 are merely illustrative as any desired pattern can be provided on a particular cooking surface. By having two cooking surfaces 21, 22, the need to carry additional cooking supplies when camping, such as a griddle for pancakes and a grill or fish or meat, is minimized.

Figure 8:
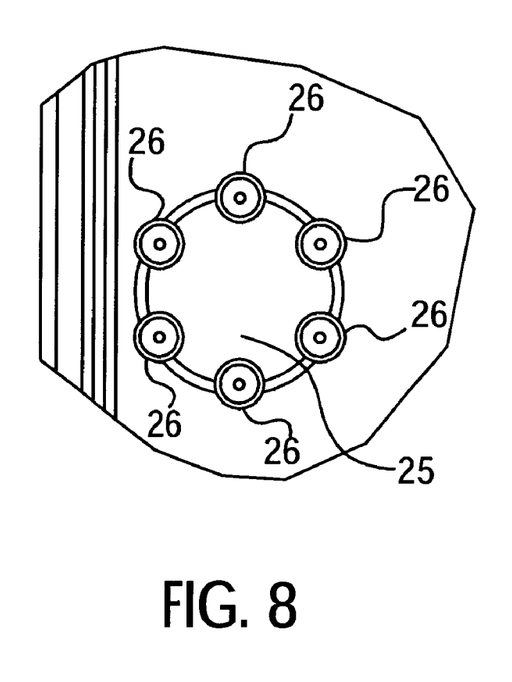
FIG. 8 illustrates an exemplary opening in a cooking surface according to an embodiment of the present invention.

According to an exemplary embodiment of the present invention, griddle 10 includes a roughly circular opening 25. Because griddle 10 in an embodiment of the present invention includes two cooking surfaces 21, 22, both cooking surfaces 21, 22 can generate grease when in use, such as from frying bacon. Accordingly, the grease has to be withdrawn from the cooking surface to avoid spillage and undesired flare-up as well as drawing the grease away from the food being cooked. It is preferable for the grease to drip directly downward into drip tray 1 which is removably attachable to handle 7. Opening 25 is provided in cooking surfaces 21, 22 for waste removal.

As shown in FIG. 1, drip tray 1 connects to handle 7 and extends under the cooking surface 21, 22 (dimple). The connection between drip tray 1 and handle 7 can be via, for example, tabs on drip tray 1 that lock into corresponding holes in handle 7. Drip tray 1 is made of, for example, the same material as handle 7. To achieve the desired flow of waste through opening 25 and into drip tray 1, a series of bumps 26 or other suitable protrusions are disposed, for example, around the perimeter of opening 25 which induce the waste flowing through the opening 25 to form drops and fall directly into drip tray 1 instead of running along the undersurface of griddle 10. The bumps or protrusions 26 provide a specific path for the liquid to follow through opening 25.

According to an exemplary embodiment of the present invention, not only can two different cooking surfaces be provided on a single griddle 10, but also each cooking surface can have a non-stick coating that is not damaged when the cooking surface not in use is exposed to heat from the heat distribution system. As illustrated in FIG. 1, the heat distribution system includes, for example, heat shield 13, tube burner 15 and heat diffuser 11.

Tube burner 15 is conventional as is known in the art and includes a plurality of openings along two sides to emit the air-fuel mixture to be ignited upon emission from the openings of tube burner 15. Tube burner 15 may be made of aluminized steel or other suitable material. Heat shield 13 is disposed below tube burner 15 and connected to case 6 for support. Heat shield 13 minimizes heat transfer to the case 6 by acting as a radiant shield, thereby allowing safe tabletop temperatures with a low profile. Heat shield 13 can be manufactured of, for example, aluminized steel and could also be aluminum, stainless steel or a plated steel. The heat shield 13 channels secondary air to tube burner 15 as described below.

Heat diffuser 11 acts as a barrier between the tube burner 15 and the undersurface of the griddle 10 (e.g., the cooking surface 21, 22 not in use). The heat diffuser 11 prevents, for example, flames from the tube burner 15 from impinging directly on the non-stick coating on the undersurface of the griddle 10 and spreads the combustion gases towards the perimeter of the griddle 10. Heat diffuser 11 can be made of, for example, stainless steel, such as 430 stainless steel due to the desire to have the diffuser resist corrosion and withstand high temperatures, although cold rolled steel also could be used but may present corrosion problems.

As illustrated in FIG. 1, heat diffuser 11 has side portions 112 that extend upwards towards griddle 10 and angle towards the perimeter of griddle 10. In addition, the projections 110 on the diffuser 11 are configured to form openings 111 between adjacent projections 110 that have a quasi V-shape. For example, the openings 111 could have an approximately 8 degree opening.

In operation, combustion gas (e.g., propane ignited upon exit from the tube burner 15) provides a flame that naturally flows upwards towards the side portions 112 of heat diffuser 11. By angling side portions 112 upwards, the side portions 112 are optimally positioned to receive maximum heating from the flames. The flames from tube burner 15 heat the side portions 112 of diffuser 11 which in turn provides radiant heat towards the center portion of griddle 10. Thus, there is little, if any, direct flame impingement on the center of griddle 10, the use of radiant heat from diffuser 11 protecting the non-stick coating on the undersurface of griddle 10.

Since the heat generated by the combustion gas is greatest at the center portion of the griddle 10 and decreases towards the perimeter of the griddle, the projections 110 of diffuser 11 push the combustion gas away from the center of the griddle 10. Openings 111 between projections 110 allow some combustion gas to escape towards the undersurface of griddle 10 for heating purposes while the projections 110 push the combustion gas further towards the perimeter of the griddle 10 to achieve even heating of the entire cooking surface 21, 22 instead of concentrating the heating in the center portion of the griddle 10.

Figure 6:
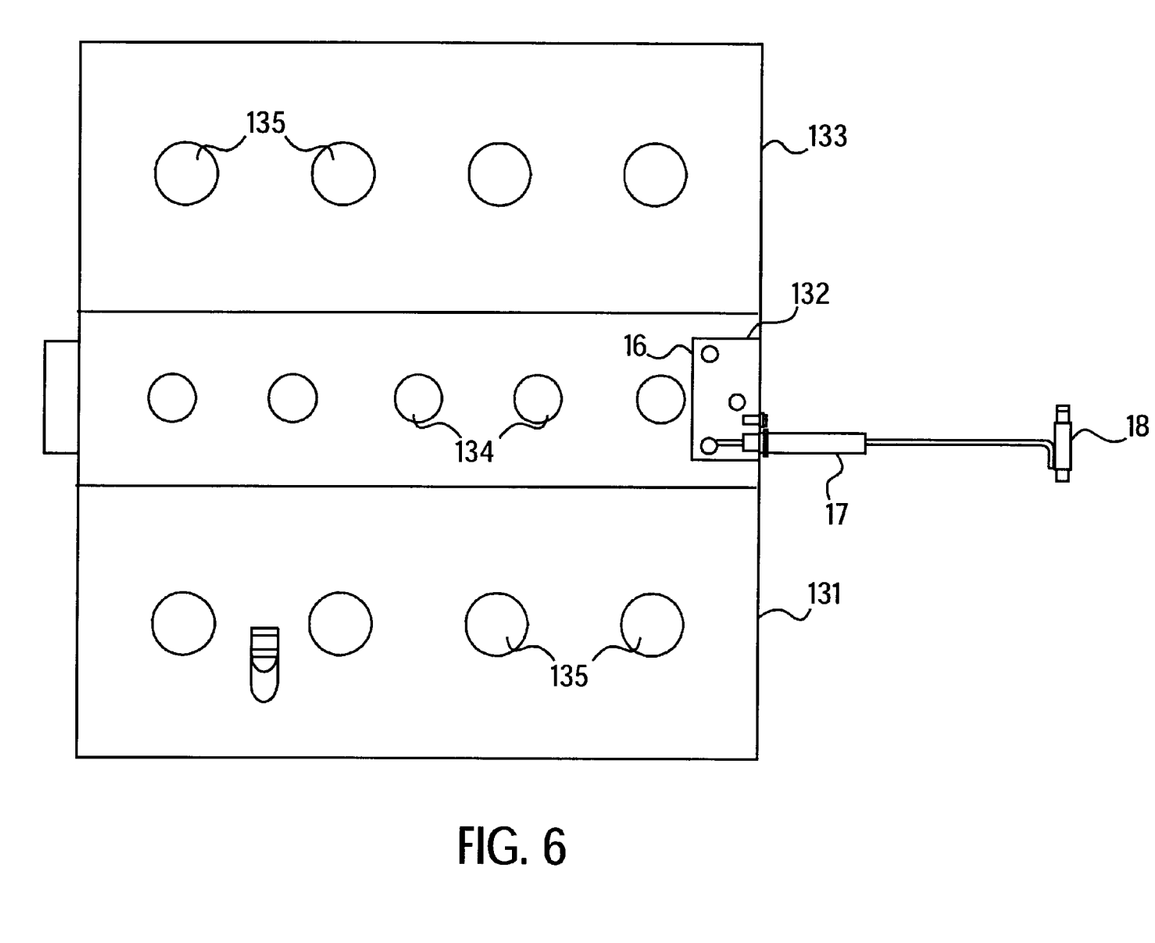
FIG. 6 illustrates an exemplary heat shield assembly according to an embodiment of the present invention.

Even with the projections 110 pushing the combustion gas towards the perimeter of the griddle 10, the combustion gas may not be sufficiently cooled and could damage the non-stick coating on the undersurface of the griddle 10. Accordingly, in an exemplary embodiment of the present invention, a secondary air system is utilized. Referring to FIG. 6, heat shield 13 includes, for example, a center portion 132 and two edge portions 131, 133 extending from either side of center portion 132 and angled upwards so as to be angled towards burner tube 15 (e.g., see FIG. 1). Center portion 132 includes, for example, a series of openings 134 disposed below tube burner 15. Openings 134 channel secondary air to the tube burner 15. Some additional air may be available from a gap between the undersurface of griddle 10 and upper portion of case 6 adjacent to the handle. With no additional airflow to mix with the combustion gas, however, the combustion gas could be sufficiently hot to damage the underside of the non-stick cooking surface as well as the bottom pan of the grill (e.g., a painted surface on the bottom of case 6 could burn).

Figure 7:
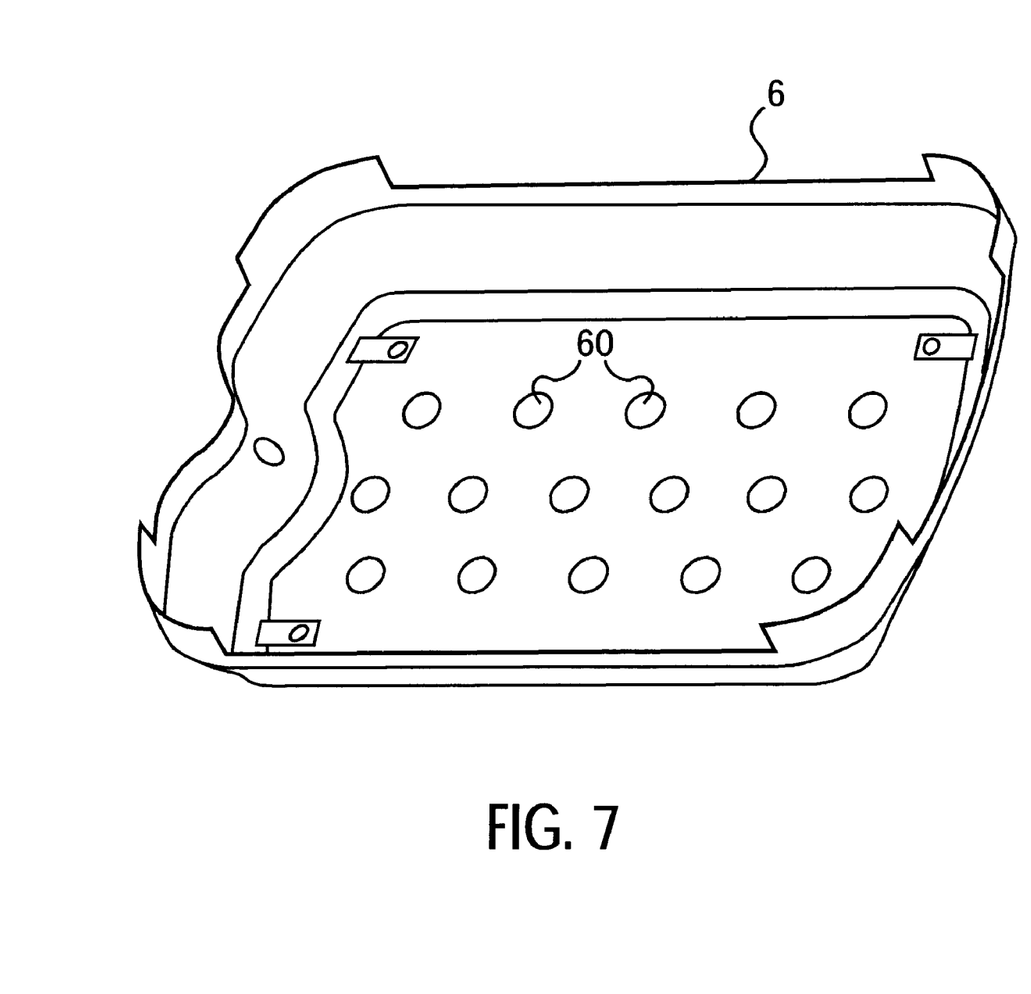
FIG. 7 illustrates an exemplary case according to an embodiment of the present invention.

Accordingly, a secondary air system is utilized according to an exemplary embodiment of the present invention. Edge portions 131, 133 of heat shield 13 include, for example, openings 135 that provide additional air flow to cool the combustion gas that is pushed to the perimeter of the griddle 10 by the heat diffuser 11. Openings 135 are arranged to create a flow of air between openings 135 and openings 60 in the bottom of case 6, as illustrated in FIG. 7. For example, openings 134 and 135 in heat shield 13 are arranged offset from openings 60 in case 6 to provide an airflow path. Openings 134 and 135 are generally not aligned with openings 60 to prevent a direct path for heat radiation to the tabletop or other surface on which the stove is placed. Alignment of openings could generate a hotspot on the underlying surface and create a safety problem.

Accordingly, openings 60 in case 6 and openings 134, 135 in heat shield 13 allow fresh air into the grill and can be arranged as a function of offset placement of the openings to channel fresh air to predetermined locations so, for example, the fresh air interacts with the combustion gas towards the perimeter of the diffuser 11. It is further noted that by angling the edge portions 131, 133 of heat shield 13 towards tube burner 13 and the perimeter of griddle 10, the mixing of the secondary air with the combustion gas not only cools the combustion gas to a safe temperature for interaction with the underside of the cooking surface, but also causes the volume of combustion gas to expand, thus causing the combustion gas to expand above the heat diffuser 11 to safely heat the perimeter of the cooking surface 21, 22. The combination of the heat diffuser 11 and heat shield 13 also dilutes the combustion gases to cool and disperse the heat generated by tube burner 15 so as to not harm the underside cooking surface 21, 22 and provide even heating of the griddle 10.

The fuel delivery system includes, for example, a conventional regulator assembly 14 that connects to a propane tank (not shown), and a venturi assembly 12 connected to a tube burner 15. Fuel is provided, for example, by a propane tank (not shown) attached to the regulator assembly 14, such as a portable propane tank manufactured by The Coleman Company, Inc. of Wichita, Kans. According to an exemplary embodiment of the present invention, the regulator assembly 14 connects to the venturi assembly 12 via, for example, spring clip 36. In this case, no clocking of the regulator assembly 14 or threading is required compared to a conventional connection which employs a threaded connection or notch and lock mating between the regulator and the burner tube 15 via the venturi assembly 12.

Figure 3:
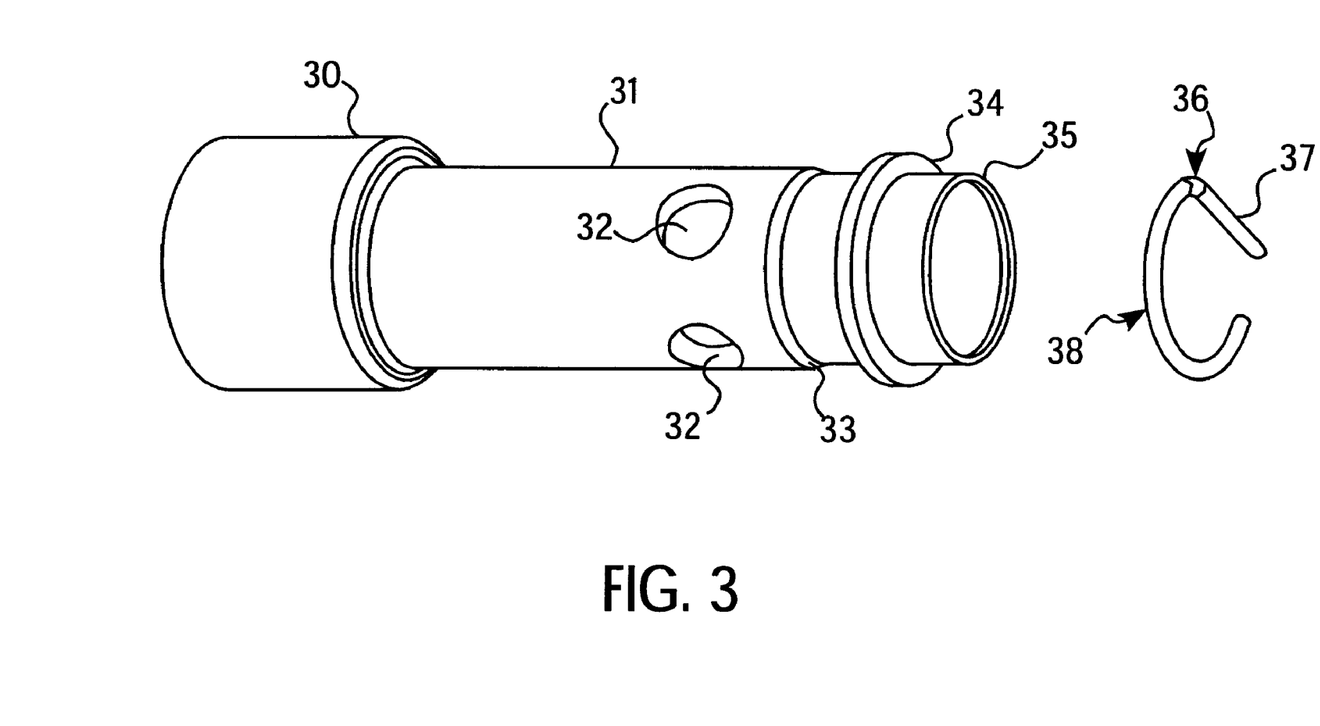
FIG. 3 illustrates an exemplary connection of a venturi assembly according to an embodiment of the present invention.
Figure 5:
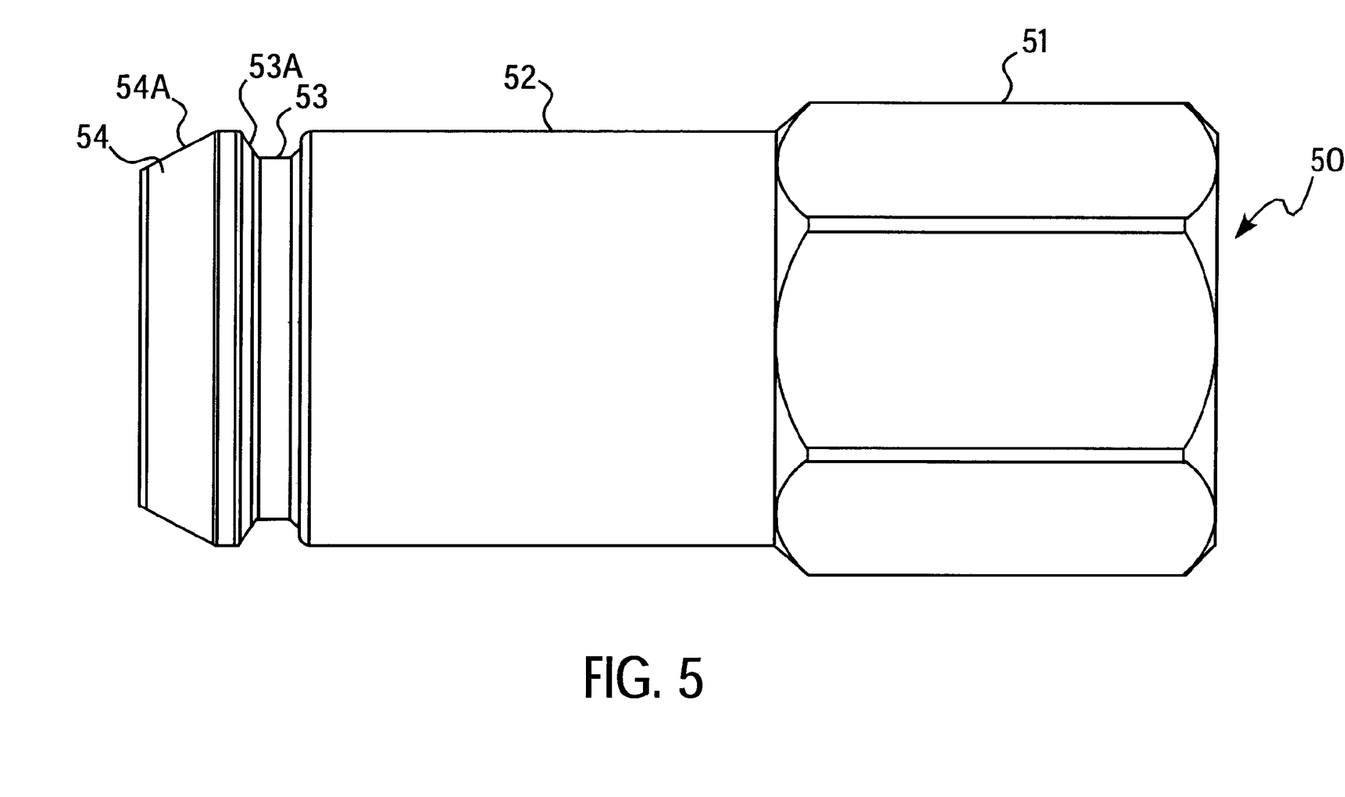
FIG. 5 illustrates an exemplary regulator assembly connector according to an embodiment of the present invention.

As illustrated in FIGS. 3 and 5, according to an exemplary embodiment of the present invention, venturi assembly 12 is generally cylindrical with a tube mating portion 30 that attaches to the tube burner 15 via, for example, a slip fit. An alternative connection could be, for example, a press fit or threaded connection. Adjacent to tube mating portion 30 is a center portion 31 including openings 32. Openings 32 allow air to mix with the fuel that passes through center portion 31. Towards one end of center portion 31, a groove 33 extends around the circumference of the center portion 31. Along a portion of the circumference of groove 33, for example 90° of the circumference of groove 33, material is completely removed (e.g., a slot is milled) so that an opening extends around a portion of the circumference of center portion 31. Accordingly, groove 33 can releasably receive a spring clip 36 having a flat portion 37 and cylindrical portion 38, the flat portion 37 being disposed in the opening in groove 33. Flange 34 bears against the backside of cover 8 to prevent venturi assembly 12 from slipping out of tube burner 15. End portion 35 protrudes through cover 8 to provide the point of connection for connector 50 of regulator assembly 14.

As shown in FIG. 5, connector 50 of regulator assembly 14 includes, for example, hexagonal portion 51 providing a threaded connection to a connector tube of regulator assembly 14 transporting fuel towards the venturi assembly 12. Adjacent to hexagonal portion 51 is, for example, a cylindrical center portion 52. Groove 53 having, for example, a profiled edge 53A, is disposed between center portion 52 and gastip 54 and extends the circumference of center portion 52. Gastip 54 includes, for example, a profiled edge 54A. In an embodiment of the present invention, profiled edge 54A forms a lesser angle with respect to horizontal than profiled edge 53A.

Thus, in operation gastip 54 of connector 50 is inserted into end portion 35 of venturi assembly 12. When gastip 54 is inserted into venturi assembly 12, profiled edge 54A engages spring clip 36, which is disposed in groove 33, the flat portion 37 of spring lip 36 extending through the opening in groove 33. With sufficient force applied to connector 50, profiled edge 54A passes under spring clip 36 and flat portion 37 engages groove 53 in connector 50. As a result, regulator assembly 14 is held in place in venturi assembly 12 by spring clip 36. To remove connector 50, force is applied to connector 50 to extract it from venturi assembly 12, the force required generally being greater for removal than insertion due to the steeper edge 53A having to be overcome. According to an exemplary embodiment of the present invention employing such a spring clip connection or other similar connection, operation of the portable grill is simplified and the orientation of the fuel tank is no longer relevant. Connector 50 and venturi assembly 12 can be made of, for example, brass or plated steel. It will be appreciated by those skilled in the art that the above described connection of venturi assembly 12 and connector 50 can be utilized for connecting other components in a similar manner.

Figure 4:
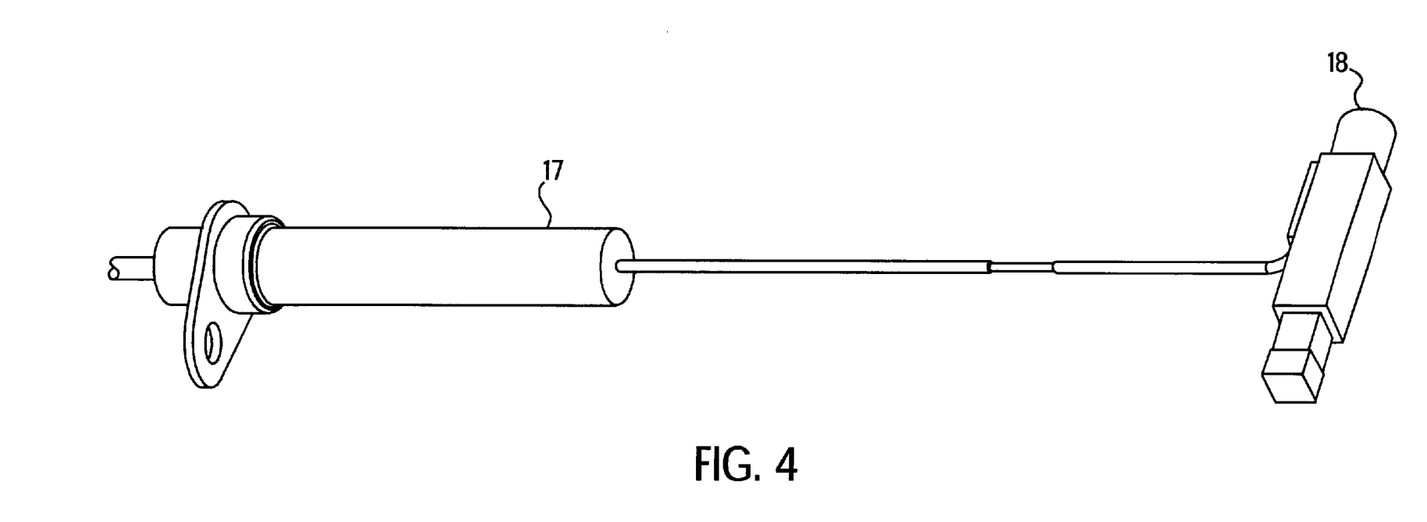
FIG. 4 illustrates an exemplary ignition system according to an embodiment of the present invention.

The ignition system according to an exemplary embodiment of the present invention is conventional as is known in the art. The ignition system includes, for example, an ignition box 16, an electrode 17, a piezoelectric igniter 18 and a grounding strap 5 as illustrated in FIGS. 1, 4 and 6. The electrode 17 attaches to the ignition box 16 with, for example, a screw, forming a spark gap through which a portion of the fuel-air mixture flows. The piezoelectric igniter 18 attaches to the cover 8 with, for example, igniter bracket 9 and screws. The grounding strap 5 attaches to the cover and provides grounding to the chassis. Button cover 2 may press into the cover to conceal the tip of the piezoelectric igniter 18.

Thus, according to an exemplary embodiment of the present invention, a portable griddle stove is provided that has two non-stick cooking surfaces 21, 22, either of which can withstand being on the underside of the cooking surface in use and the heat applied to the underside surface. A heat shield 13 and heat diffuser 11 control the temperature applied to the underside of the cooking surface by providing radiant heat to the center portion of the cooking surface 21, 22 and cooling the combustion gas diffused to the perimeter of the cooking surface 21, 22. Secondary air provided through openings in case 6 and heat shield 13 assist in cooling the combustion gas.

What is claimed is:

1. A stove comprising:

a housing;

a heat distribution system disposed in the housing; and a griddle removably connected to the housing;

wherein the griddle includes a first side having a first non-stick cooking surface and a second side opposite the first side, the second side having a second non-stick cooking surface, one of the first side and the second side facing towards the heat distribution system;

wherein the heat distribution system includes a heat shield connected to the housing, a tube burner disposed above the heat shield and a heat diffuser disposed above the tube burner;

wherein the heat diffuser includes a center portion adjacent two angled portions, each of the two angled portions having a plurality of projections, a plurality of openings being formed between adjacent projections.

2. A stove comprising:

a housing;

a heat distribution system disposed in the housing; and a griddle removably connected to the housing;

wherein the griddle includes a first side having a first non-stick cooking surface and a second side opposite the first side, the second side having a second non-stick cooking surface, one of the first side and the second side facing towards the heat distribution system;

further comprising a handle attached to each end of the housing, a drip tray being removably coupled to the handle at one end of the housing.

3. The stove according to claim 2, wherein an opening extends through the first side and second side of the griddle, a plurality of protrusions being arranged along a perimeter of the opening, the opening being disposed above the drip tray.

4. A stove comprising:

a housing;

a heat distribution system disposed in the housing; and a griddle removably connected to the housing;

wherein the griddle includes a first side having a first non-stick cooking surface and a second side opposite the first side, the second side having a second non-stick cooking surface, one of the first side and the second side facing towards the heat distribution system;

further comprising a venturi assembly connected to the heat distribution system and a regulator assembly connected to the venturi assembly;

wherein the venturi assembly includes a cylindrical portion having a circumferential groove, a portion of the circumferential groove being removed to form a slot, a spring clip being removably disposed in the groove.

5. The stove according to claim 4, wherein the regulator assembly includes a connector having a profiled edge adjacent a circumferential groove, the connector releasably engaging the cylindrical portion of the venturi assembly, the profiled edge releasably engaging a flat portion of the spring clip disposed in the slot, the flat portion of the clamp also being disposed in the circumferential groove of the connector.

6. The stove according to claim 4, wherein the spring clip includes a flat portion.

7. A stove, comprising:

a housing;

a heat distribution system disposed in the housing; and a griddle removably connected to the housing;

wherein the griddle includes a first side and a second side opposite the first side, at least one of the first side and the second side having a non-stick cooking surface;

wherein the heat distribution system includes a heat shield connected to the housing, a tube burner disposed above the heat shield and a heat diffuser disposed above the tube burner;

wherein the heat diffuser includes a center portion adjacent two angled portions, each of the two angled portions having a plurality of projections, a plurality of openings being formed between adjacent projections.

8. The stove according to claim 7, further comprising a handle attached to each end of the housing, a drip tray being removably coupled to the handle at one end of the housing.

9. The stove according to claim 8, wherein an opening extends through the first side and second side of the griddle, a plurality of protrusions being arranged along a perimeter of the opening, the opening being disposed above the drip tray.

10. The stove according to claim 7, further comprising a venturi assembly connected to the heat distribution system and a regulator assembly connected to the venturi assembly.

11. The stove according to claim 10, wherein the venturi assembly includes a cylindrical portion having a circumferential groove, a portion of the circumferential groove being removed to form a slot, a spring clip being removably disposed in the groove.

12. The stove according to claim 11, wherein the regulator assembly includes a connector having a profiled edge adjacent a circumferential groove, the connector releasably engaging the cylindrical portion of the venturi assembly, the profiled edge releasably engaging a flat portion of the spring clip disposed in the slot, the flat portion of the clamp also being disposed in the circumferential groove of the connector.

13. The stove according to claim 11, wherein the spring clip includes a flat portion.

* * * * *

UNITED STATES PATENT AND TRADEMARK OFFICE
CERTIFICATE OF CORRECTION

PATENT NO.    : 6,267,047 B1
DATED         : July 31, 2001
INVENTOR(S)   : Robert F. Mosher II et al.

Page 1 of 1

It is certified that error appears in the above-identified patent and that said Letters Patent is hereby corrected as shown below:

Title page,
Item [56], References Cited, U.S. PATENT DOCUMENTS, add the following:

--2,722,883 11/1955 Rignell
     2,881,695 4/1959 Di Pietro
     2,903,549 9/1959 Joseph
     2,905,077 9/1959 Del Francia
     3,173,357 3/1965 Nunnery
     3,348,472 10/1967 Anetsberger et al
     3,396,716 8/1968 Weyland et al
     3,418,921 12/1968 Fautz
     3,586,518 6/1971 Folmar
     3,593,647 7/1971 Copeland, Jr
     3,771,510 11/1973 Short
     3,989,028 11/1976 Berger
     4,126,087 11/1978 McLamb
     4,321,857 3/1982 Best
     4,402,300 9/1983 Houck
     4,561,418 12/1985 Cairns
     4,627,408 12/1986 Schlosser
     4,677,964 7/1987 Lohmeyer et al
     4,727,853 3/1988 Stephen et al
     5,566,606 10/1996 Johnston
     5,613,486 3/1997 Johnston
     5,617,778 4/1997 Schroeter et al--.

Signed and Sealed this

Twenty-seventh Day of April, 2004

JON W. DUDAS
*Acting Director of the United States Patent and Trademark Office*